United States Patent
Finnie et al.

(10) Patent No.: US 11,249,980 B2
(45) Date of Patent: *Feb. 15, 2022

(54) UPDATING OF IN-MEMORY SYNOPSIS METADATA FOR INSERTS IN DATABASE TABLE

(71) Applicant: International Business Machines Corporation, Armonk, NY (US)

(72) Inventors: James L Finnie, Boeblingen (DE); Sam S Lightstone, Toronto (CA); Richard S Sidle, Ottawa (CA); Adam J. Storm, Toronto (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 399 days.

This patent is subject to a terminal disclaimer.

(21) Appl. No.: 16/289,641

(22) Filed: Feb. 28, 2019

(65) Prior Publication Data
US 2019/0197031 A1 Jun. 27, 2019

Related U.S. Application Data

(60) Continuation of application No. 15/290,191, filed on Oct. 11, 2016, now Pat. No. 10,275,481, which is a
(Continued)

(51) Int. Cl.
*G06F 16/23* (2019.01)
*G06F 16/22* (2019.01)
*G06F 11/14* (2006.01)

(52) U.S. Cl.
CPC ...... *G06F 16/2365* (2019.01); *G06F 16/2282* (2019.01); *G06F 16/2358* (2019.01);
(Continued)

(58) Field of Classification Search
CPC .......... G06F 16/221; G06F 16/2228; G06F 16/2282; G06F 16/2358; G06F 16/2365; G06F 16/2379; G06F 11/1469
See application file for complete search history.

(56) References Cited

U.S. PATENT DOCUMENTS 6,676,772 B2  1/2004  Saito
6,973,452 B2  12/2005  Metzger et al.
(Continued)

OTHER PUBLICATIONS

List of IBM Patents or Applications Treated as Related dated Feb. 21, 2019.

*Primary Examiner* — Marcin R Filipczyk
(74) *Attorney, Agent, or Firm* — Anthony Curro (57) ABSTRACT

In updating a synopsis table of a database system, a database management unit performs a transaction to insert row(s) in a section of the base table and determines whether a synopsis entry for the section is stored in the memory. If stored in the memory, the in-memory synopsis entry is retrieved and metadata values in the in-memory synopsis entry are updated with data from the row(s) to be inserted. If not stored in the memory, the in-memory synopsis entry is generated and the metadata values in the in-memory synopsis entry are updated with data from the row(s). The insert transaction is then committed. Synopsis entry on-disk updates are thus avoided, significantly reducing the cost of updating the synopsis entries from the insert transaction. This yields enhanced performance especially for inserts of a small number of rows, while the benefits of synopsis entries are still available.

15 Claims, 5 Drawing Sheets

Related U.S. Application Data division of application No. 14/967,346, filed on Dec. 13, 2015, now Pat. No. 9,519,676.

(52) U.S. Cl.
CPC ...... *G06F 16/2379* (2019.01); *G06F 11/1469* (2013.01); *G06F 16/221* (2019.01); *G06F 16/2228* (2019.01)

(56) References Cited

U.S. PATENT DOCUMENTS

| | | | |
|---|---|---|---|
| 8,676,772 B2 * | 3/2014 | Gislason | G06F 16/254 707/696 |
| 2011/0307472 A1 | 12/2011 | Slezak et al. | |
| 2013/0282668 A1 | 10/2013 | Hsieh | |
| 2014/0149433 A1 | 5/2014 | Lakshminarayan et al. | |
| 2015/0088812 A1 * | 3/2015 | Ziauddin | G06F 16/21 707/609 |
| 2015/0242506 A1 | 8/2015 | Dickie et al. | |
| 2015/0286681 A1 | 10/2015 | Baer et al. | |
| 2016/0292206 A1 * | 10/2016 | Ruiz Velazquez | G06F 16/2358 |
| 2017/0060890 A1 | 3/2017 | Booman et al. | |

\* cited by examiner

UPDATING OF IN-MEMORY SYNOPSIS METADATA FOR INSERTS IN DATABASE TABLE

Applicant hereby rescinds all limitations or disclaimers that may have been expressed or implied by applicant's remarks or applicant's amendments of the claims in all other patent applications, including the parent application (U.S. patent application Ser. No. 15/290,191). Applicant respectfully requests that the Examiner examine the claims presented in this continuing application solely on their merits and independent of said limitations and disclaimers. Applicant respectfully requests that the Examiner revisit all prior art, including references cited against any claims in the other patent applications.

BACKGROUND

The present invention relates to inserts in a database table, and more specifically, to the updating of synopsis metadata for inserts in a database table.

Analytical databases are under enhanced pressure to increase performance of online transaction processing (OLTP) transactions, such as inserts of small numbers of rows. Users are requesting that their analytical databases always have the most up-to-date data available, meaning new data must constantly be trickle-fed into the analytical database as it arrives, rather than in bulk load operations as was previously the norm. Rather than relying on traditional database indexes, analytical databases also typically store minimum and maximum data value information for a number of rows physically located close to each other on disk, in order to enhance table scan performance by being able to skip over large numbers of rows that are guaranteed not to be able to match predicate conditions supplied in queries. This type of minimum and maximum data value information describing a subset of rows in the table is stored in zone maps, nearly-ordered maps, synopsis tables, or other similar structures.

The prior art document U.S. Pat. No. 6,973,452 B2 describes an approach for limiting scans of loosely ordered and/or grouped relations using nearly ordered maps. In this approach a large information space is divided into smaller information extents. These extents are annotated with statistics about the information they contain. When a search for information includes a restriction based on value, the desired value ranges can be compared to the value ranges of each extent. If the desired value range lies outside the range of the extent, then the extent cannot hold the desired value and does not need to be included in the search. The nearly ordered map table entries, each entry consisting of a table identifier, a column-index, a minimum data value, a maximum data value and an extent identifier, are grouped by column index, so that all the entries for the $n^{th}$ column of a table are grouped together in a single block.

However, the cost of creating or updating a synopsis entry (or nearly-ordered map entry, as referenced in U.S. Pat. No. 6,973,452 B2) in a synopsis table incurs significant overhead for inserts of a small number of rows, as the newly created or updated synopsis entry or entries must be updated and persisted to disk as part of the insert transaction. This persistence may be as part of a log record or by physically writing the synopsis entry itself out to disk. This problem in turn restricts the ability of analytical databases from meeting customers' demands for ingesting real-time data into their data warehouse, and so from being able to run analytical queries on real-time data.

SUMMARY

Disclosed herein is a method for updating a synopsis table for inserts in a base table and a corresponding database system and a computer program product as specified in the independent claims. Embodiments of the present invention are given in the dependent claims. Embodiments of the present invention can be freely combined with each other if they are not mutually exclusive.

In one aspect, the present invention relates to a method for updating a synopsis table for inserts in a base table stored in a storage medium comprised in a database system, the storage medium further storing the synopsis table, the database system further comprising a memory and a database management unit for implementing the method. The method comprises performing an insert transaction to insert at least one row in a given section of the base table and determining whether a synopsis entry for the given section of the base table is stored in the memory. In response to determining that the synopsis entry for the given section of the base table is stored in the memory, the method further comprises retrieving the in-memory synopsis entry for the given section of the base table, and updating metadata values in the in-memory synopsis entry for the given section of the base table with data from the at least one row being inserted into the base table. In response to determining that the synopsis entry for the given section of the base table is not stored in the memory, the method further comprises generating the in-memory synopsis entry for the given section of the base table, and updating the metadata values in the in-memory synopsis entry for the given section of the base table with data from the at least one row being inserted into the base table. The method further comprises committing the insert transaction.

Embodiments may have the advantage that synopsis entry on-disk updates are avoided, which significantly reduces the cost of updating the synopsis entries from the insert transaction. This yields enhanced performance especially for inserts of a small number of rows. At the same time, the benefits of synopsis entries are still available.

In some embodiments, the method may further comprise determining that the in-memory synopsis entry for the given section of the base table is to be persisted to disk according to at least one predetermined criteria and, in response, storing the in-memory synopsis entry in the synopsis table.

In some embodiments, the at least one predetermined criteria comprise one or more of the following: persisting the in-memory synopsis entry for the given section of the base table asynchronously to the insert transaction; a certain number of rows have been added to the base table; an entire page or section of the base table is full; and a certain amount of time has elapsed.

By persisting synopsis entries to disk at certain points in time, the present invention balances the enablement of quick database activation and consistent query performance with the avoidance of the synopsis entry update costs typically incurred for the insert transaction.

In some embodiments, in response to determining that the synopsis entry for the given section of the base table is not stored in the memory, the method may generate the in-memory synopsis entry for the given section of the base table, read a synopsis entry row count stored in base table metadata of the base table, the synopsis entry row count indicating a number of rows in the given section of the base table covered by the in-memory synopsis entry, determine that the in-memory synopsis entry does not have missing data based on the synopsis entry row count, update the metadata values in the in-memory synopsis entry for the given section of the base table with data from the at least one row being inserted into the base table, and increment the synopsis entry row count in the base table metadata.

In some embodiments, in response to determining that the synopsis entry for the given section of the base table is not stored in the memory, the method may generate the in-memory synopsis entry for the given section of the base table, read a synopsis entry row count stored in base table metadata of the base table, the synopsis entry row count indicating a number of rows in the given section of the base table covered by the in-memory synopsis entry, determine that the in-memory synopsis entry has missing data based on the synopsis entry row count, regenerate the missing data of the in-memory synopsis entry by scanning the given section of the base table, update the metadata values in the in-memory synopsis entry for the given section of the base table with data from the at least one row being inserted into the base table, and increment the synopsis entry row count in the base table metadata.

In some embodiments, in committing of the insert transaction, the method may write to the storage medium the at least one row into the base table, and write to the storage medium updated base table metadata of the base table, the updated base table metadata comprising a synopsis entry row count indicating a number of rows in the given section of the base table covered by the in-memory synopsis entry.

In some embodiments of the present invention, the synopsis entry row counter notified the database management unit that data in the in-memory synopsis entry must be regenerated. The synopsis entry row counter can be persisted to disk on the same page or same log record as the existing base table metadata that are persisted to disk as part of the insert transaction commit processing. The synopsis entry row counter does not add any significant cost to the commit processing and can be referenced in the event of a database system failure.

In another aspect, the present invention relates to a method for updating a synopsis table for inserts in a base table stored in a storage medium comprised in a database system, the storage medium further storing the synopsis table, the database system further comprising a memory and a database base management unit for implementing the method. The method comprises performing an insert transaction to insert at least one row in a given section of the base table and determining whether a synopsis entry for the given section of the base table is stored in the memory. In response to determining that the synopsis entry for the given section of the base table is stored in the memory, the method comprises retrieving the in-memory synopsis entry for the given section of the base table, and updating metadata values in the in-memory synopsis entry for the given section of the base table with data from the at least one row being inserted into the base table. In response to determining that the synopsis entry for the given section of the base table is not stored in the memory, the method comprises generating the in-memory synopsis entry for the given section of the base table, reading a synopsis entry row count stored in base table metadata of the base table, the synopsis entry row count indicating a number of rows in the given section of the base table covered by the in-memory synopsis entry, if the synopsis entry row count indicates that the in-memory synopsis entry has missing data then regenerating the missing data of the in-memory synopsis entry by scanning the given section of the base table, updating the metadata values in the in-memory synopsis entry for the given section of the base table with data from the at least one row being inserted into the base table, and incrementing the synopsis entry row count in the base table metadata. The method further comprises committing the insert transaction.

In another aspect, the present invention relates to a method for regenerating a lost in-memory synopsis entry corresponding to a section of a base table stored in a storage medium comprised in a database system, the storage medium further storing a synopsis table, the database system further comprising a memory and a database management unit for implementing the method. The method comprises, when performing a scan of the base table as part of a query, scanning the synopsis table stored in the storage medium, determining inability to apply at least one query predicate of the query to data in the synopsis table for a given section of the base table, in response, scanning a number of rows in the given section of the base table as specified by a synopsis entry row count stored in base table metadata of the base table, the synopsis entry row count indicating the number of rows in the given section of the base table covered by the lost in-memory synopsis entry, during the scan, applying the query predicates to the rows in the given section of the base table, and during the scan, regenerating data for the in-memory synopsis entry at least one column for the rows in the given section of the base table. The method further comprises, when performing an insert transaction to insert at least one row in the given section of the base table, determining the number of rows in the given section of the base table as specified by the synopsis entry row count, scanning the number of rows in the given section of the base table as specified by the synopsis entry row count from a page in the memory, and regenerating the data for the in-memory synopsis entry for at least one column for the rows in the given section of the base table.

Database system and computer program products corresponding to the above-summarized methods are also described and claimed herein.

DETAILED DESCRIPTION

Figure 1:
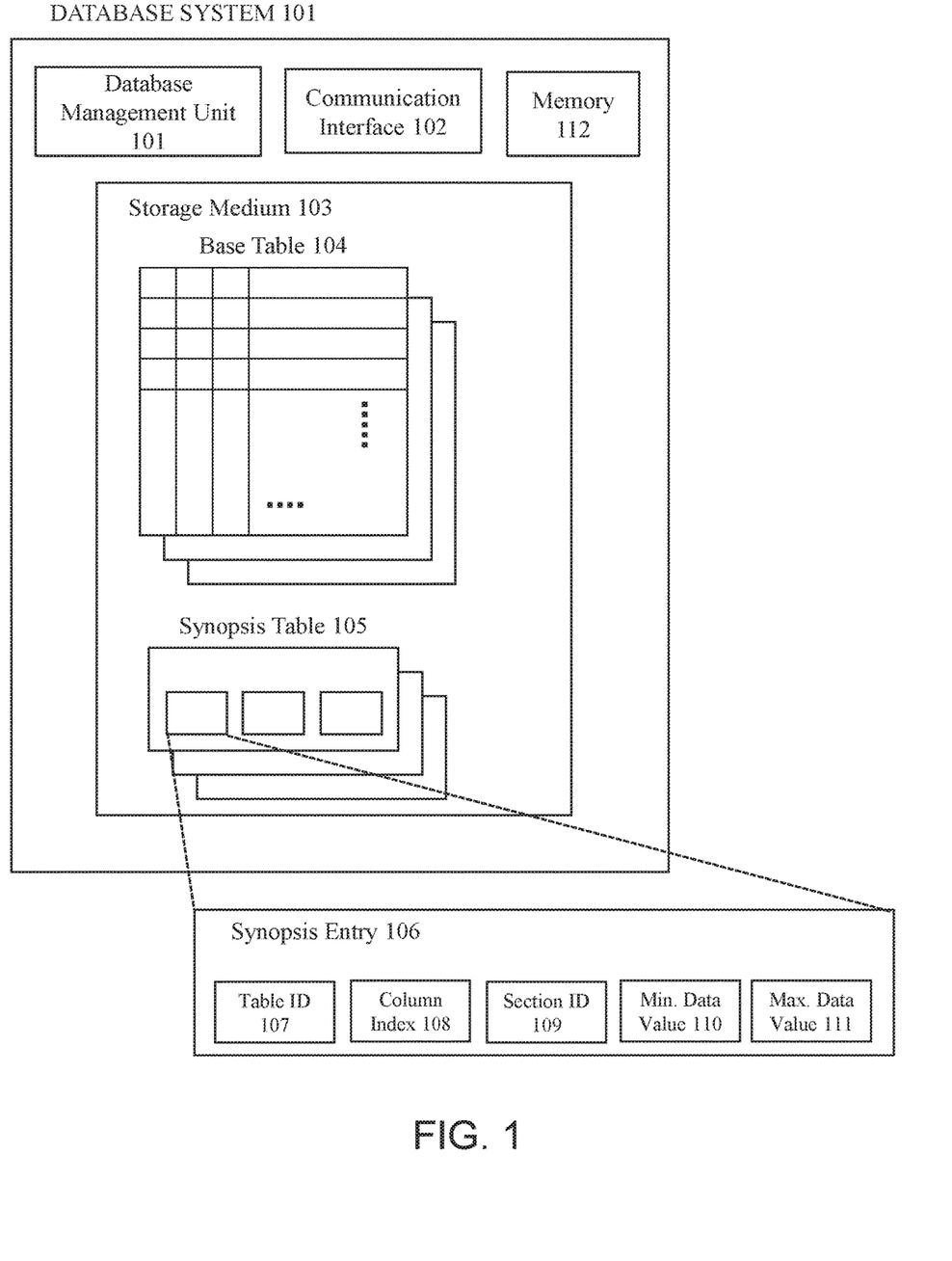
FIG. 1 is a block diagram of a database system, according to an embodiment of the present invention.

FIG. 1 is a block diagram of a database system 100, comprising a database management unit 101, a communication interface 102 and a storage medium 103. The database management unit 101 may for example comprise a central processing unit comprising one or more single or multi core processing units, the database management unit 101 further being operatively coupled to the communication interface 102 and to the storage medium 103. The database management unit 101 may further be coupled to a memory 112, such as a random access memory, and may be operable to read data from the storage medium 103 and provide the data thus extracted in the memory 112 for further processing by the processing units of the database management unit 101.

The communication interface 102 may be any kind of interface capable of communicating information from or to the database system 100. As such the communication interface may for example be an Ethernet port operable to form a logical connection to a storage area network or a local area network. Using the communication interface 102, it is possible to load data into the storage medium 103, where the loading of data into the storage medium 103 is managed by the database management unit 101.

The storage medium 103 may be any kind of digital storage like one or more hard disks, a tape storage, a plurality of solid state disks or any other digital device capable of storing data.

As illustrated in FIG. 1 the storage medium 103 comprises at least one base table 104 comprising a plurality of columns and rows. Each row may comprise one data element per column thereby forming datasets. The storage medium 103 further comprises at least one synopsis table 105. Each synopsis table 105 comprises at least one synopsis entry, such as synopsis entry 106. The synopsis entry 106 comprises statistical data for a data block or section taken from a base table 104. Synopsis entry 106 comprises a table identifier 107 for the base table 104, a column index 108 for the column in the base table 104 from which the section comprising a range of rows is taken, a section identifier 109 for the section, a minimum data value 110 of the data elements in the section, and a maximum data value 111 of the data elements in the section. This information is also gathered for the remaining possible combinations of base table, column, and section such that each section that can be analyzed with regards to the minimum and maximum data value has a corresponding synopsis entry 106 of the synopsis table 105 for the base table 104. As described further below, the synopsis entry 106 is stored in memory 112. The synopsis entry 106 is "persisted to disk", or stored in the synopsis table 105 in the storage medium 103, at some point in time.

For example, the columns of base table 104 comprised in the storage medium 103 may be indicative of a certain type of information. For example, a first column may comprise customer IDs, and a second column may comprise dates, and a third column may comprise durations of telephone conversations on the dates specified in the second column held by a user as specified by the corresponding user ID in the first column. The database system 100 may now for example receive a database query, the query asking for all the communication data available for a user with a given user ID. The database management unit 101 may then search the synopsis entry 106 in memory 112 and/or the synopsis entries in the synopsis table 105 for the base table 104, thereby determining the data sections of the first column which may comprise the given user ID. Assume that the value of the given user ID is not within the range given by the minimum value and maximum values 110-111 of the section identified by the section ID 109 and the first column identified by the column index 108. The database management unit 101 will not scan the range of rows in this section of the base table as the information queried cannot be found there. Thus, the number of rows scanned may be reduced, increasing the efficiency of the execution of the database query.

In an illustrative embodiment of the present invention, a synopsis entry 106 is stored in memory 112 and updated to reflect the minimum and maximum data values for new row(s) being inserted into the base table 104. This synopsis entry 106 is only maintained in-memory and is not persisted to disk at the time of the row insert operation. For subsequent row inserts into the same base table 104, the in-memory synopsis entry 106 is updated, until such time that the database management unit 101 determines that the criteria for persisting the in-memory synopsis entry 106 to disk are met. The in-memory synopsis entry 106 is then persisted to disk and stored as part of the synopsis table 105. Any variety of criteria may be configured to define when the in-memory synopsis entry 106 is to be persisted to disk. Example configurations include, but are not limited to, persisting the in-memory synopsis entry 106 asynchronously to the insert transaction, after a certain number of rows have been added to the base table, when an entire page or section of the base table 104 is full, after a certain amount of time has elapsed, or any other suitable criteria.

The advantage of the illustrative embodiment is that synopsis entry on-disk updates (reads or writes) are avoided, which significantly reduces the cost of updating the synopsis entries from the insert transaction. This yields enhanced performance especially for inserts of a small number of rows. At the same time, the benefits of synopsis entries are still available. Query predicates to be applied against the last-inserted rows from a table scan can be applied against the in-memory synopsis entry 106, rather than against synopsis entries stored on-disk in the synopsis table 105.

Figure 2:
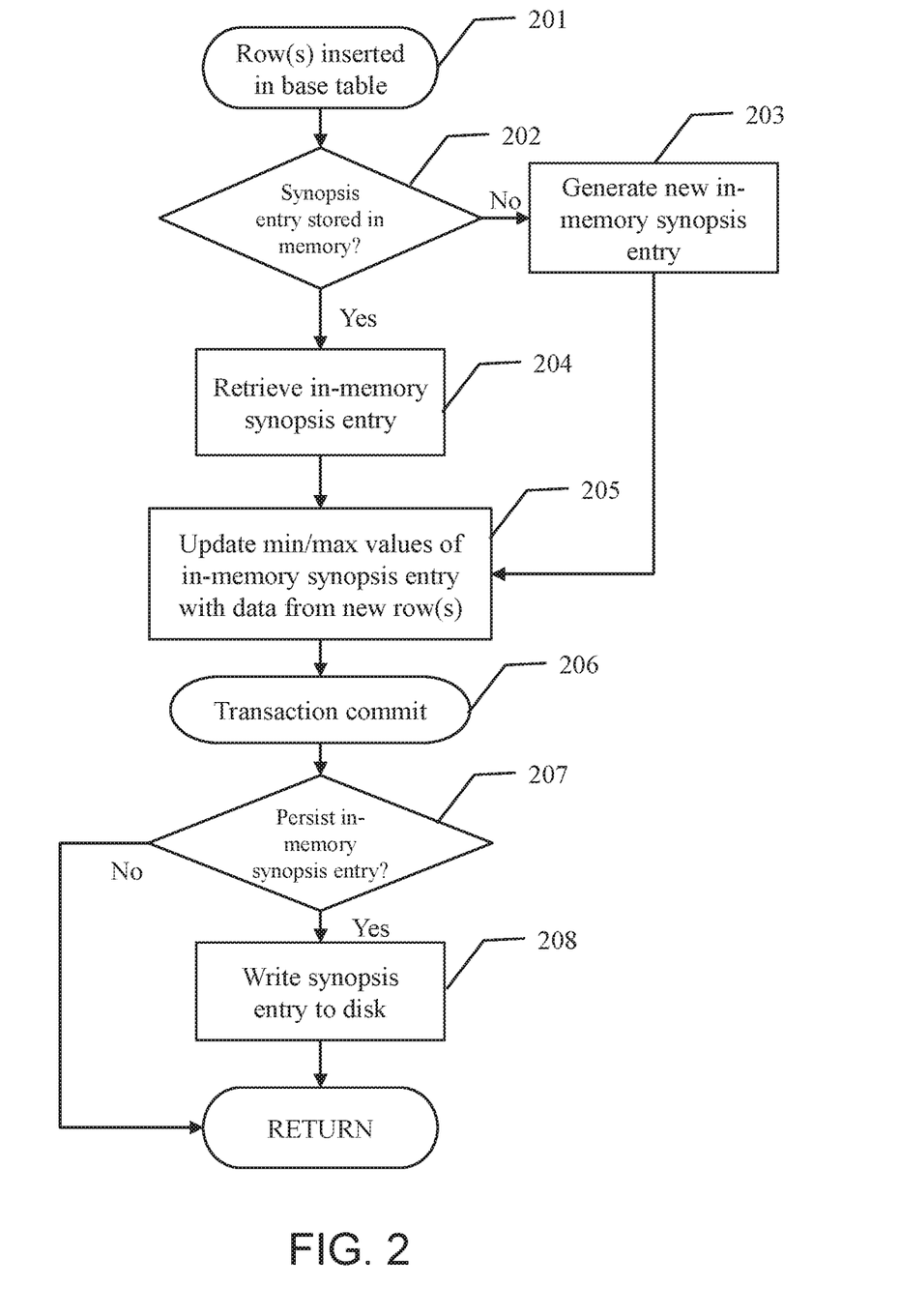
FIG. 2 is a flowchart illustrating a method for updating an in-memory synopsis entry, according to an embodiment of the present invention.

FIG. 2 is a flowchart illustrating a method for updating an in-memory synopsis entry. During the insert of at least one row into a base table 104 (201), the database management unit 101 determines whether a synopsis entry 106 for the section (e.g. range of rows) into which the row will be inserted is stored in the memory 112 (202). When no such in-memory synopsis entry is found, the database management unit 101 generates a new in-memory synopsis entry 106 (203). When the in-memory synopsis entry is found, the database management unit 101 retrieves the in-memory synopsis entry 106 (204) and updates the minimum and maximum data values 110-111 of the in-memory synopsis entry 106 with data from the newly inserted row(s) (205). The insert transaction is then committed (206). At some point, the database management unit 101 determines whether the in-memory synopsis entry 106 is to be persisted to disk (207). Various criteria, described above, may be used to define when persisting the in-memory synopsis entry 106 is to occur. If the database management unit 101 determines that the criteria are met, then the database management unit 101 writes the synopsis entry 106 to disk (208) by storing the synopsis entry 106 in the synopsis table 105. If the criteria are not met, the database management unit 101 continues to maintain the synopsis entry 106 in memory only.

In an alternative embodiment, the synopsis entries can always be generated and updated in-memory, without ever being written to disk. However, this may not be possible if the total size of all synopsis tables in the database system exceeds the amount of memory available on the machine, and/or storing all synopsis entries in memory means less memory is available for other database processing operations, such as joins, sorts, caching of temporary query results, etc. By persisting synopsis entries to disk at certain points in time, as described above with reference to FIG. 2, the illustrative embodiment of the present invention balances the enablement of quick database activation and consistent query performance with the avoidance of the synopsis entry update costs typically incurred for the insert transaction.

However, after a database system failure (from a power outage, for example), the in-memory synopsis entry not yet persisted is lost. In an illustrative embodiment, the database management unit 101 can individually query each base table 104, as well as its associated synopsis table 105, to determine for which section in the base table 104 the synopsis entries are missing and regenerates these synopsis entries.

Alternatively, an additional synopsis entry row counter may be implemented as part of the base table metadata. This synopsis entry row counter indicates the number of rows covered by the in-memory synopsis entry 106, i.e. indicates the number of rows from the base table 104 that were persisted to disk that do not also contain an on-disk synopsis entry. As part of the commit processing for an insert transaction, metadata information about the base table 104 must typically also be persisted to disk, either as a separate page from disk, or as part of the same log record associated with the insert transaction. This base table metadata information typically contains information, such as how many rows exist in the base table 104 or in a particular section of the base table 104. The synopsis entry row counter can be persisted to disk on the same page or the same log record as the existing base table metadata that are persisted to disk as part of the transaction commit processing. This new synopsis entry row counter does not add any significant cost to the commit processing and can be referenced in the event of a database system failure, as described further below.

Figure 3:
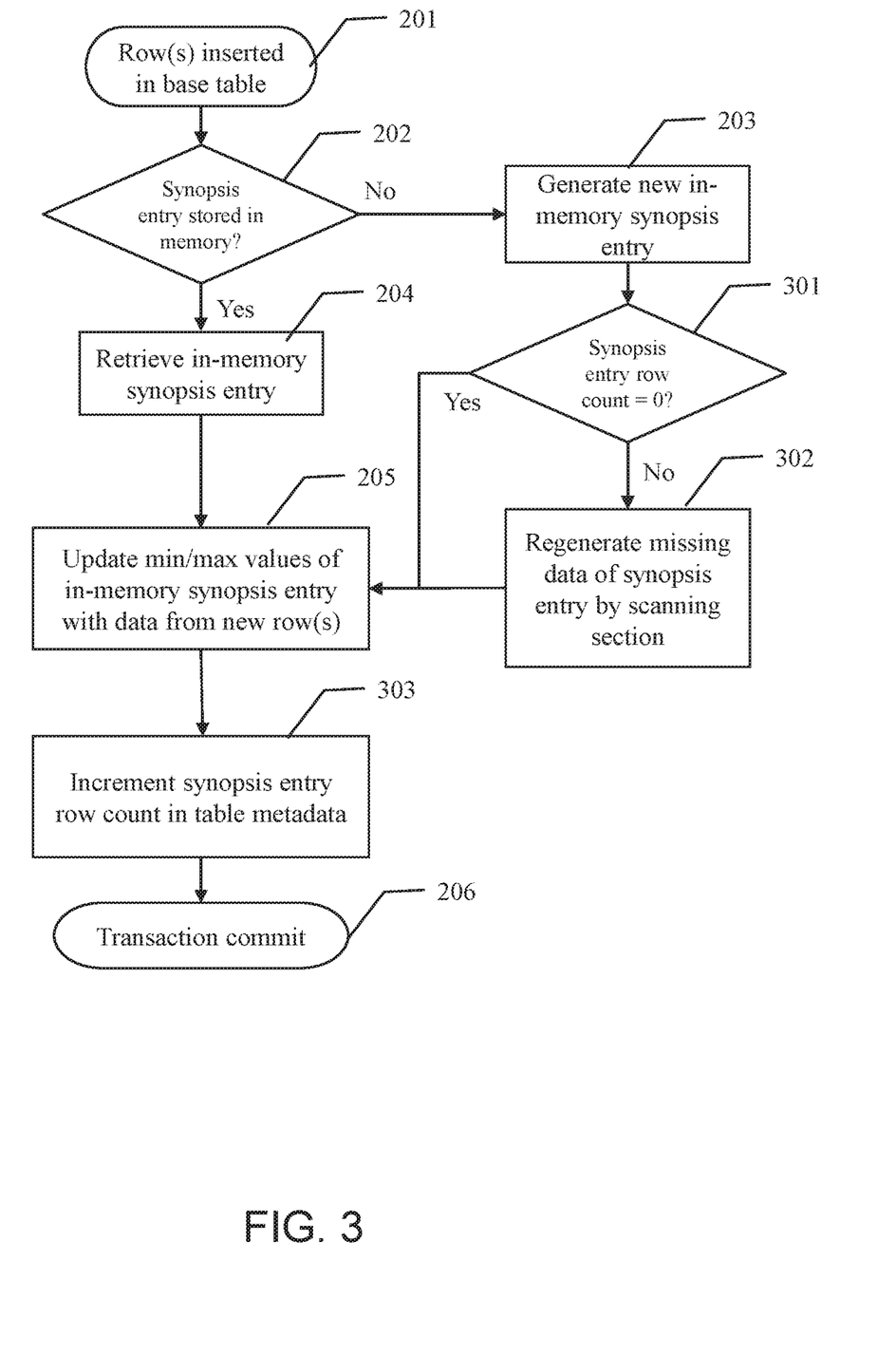
FIG. 3 is a flowchart illustrating an embodiment of a method for updating an in-memory synopsis entry using a synopsis entry row counter, according to an embodiment of the present invention.

FIG. 3 is a flowchart illustrating a method for updating an in-memory synopsis entry using a synopsis entry row counter. During the insert of at least one row into a base table 104 (201), the database management unit 101 determines whether a synopsis entry 106 for the section into which the row will be inserted is stored in the memory 112 (202). When no such in-memory synopsis entry is found, the database management unit 101 generates a new in-memory synopsis entry 106 (203). The database management unit 101 reads the synopsis entry row counter when it reads the base table metadata for the insert transaction and determines whether the synopsis entry row counter value is zero (301). Alternatively, the synopsis entry row count is computed based on other information stored in the base table metadata. When the synopsis entry row counter value is not zero, this indicates that the in-memory synopsis entry 106 has missing data. This occurs when there has been a database system failure, and the synopsis entry 106 in memory at the time of the failure has been lost. However, since the synopsis entry row counter is persisted to disk as part of an insert transaction prior to the failure, along with the inserted rows themselves, the synopsis entry row counter value is not lost and can be read by the database management unit 101. Upon determining that the synopsis entry row counter value is not zero, the database management unit 101 regenerates the missing data in the in-memory synopsis entry 106 by scanning that section of the base table, as described below with reference to FIG. 4B, and updates the minimum and maximum data values 110-111 of the in-memory synopsis entry 106 with data from the newly inserted rows(s) (205). If the in-memory synopsis entry 106 maintains other metadata or aggregate data such as small bloom filters, this other synopsis entry aggregate data can also be updated with the data values from the newly inserted row(s). When the synopsis entry row count is zero, this indicates that there are no missing data for the in-memory synopsis entry 106, and the database management unit 101 proceeds to updating the minimum and maximum data values 110-111, and/or other metadata, of the in-memory synopsis entry 106 with data from the newly inserted row(s) (205). The synopsis entry row counter in the base table metadata is then incremented in memory (303), either immediately or at transaction commit time. The insert transaction is committed (206), and as part of the transaction commit, the newly inserted rows and updated base table metadata, which includes the synopsis entry row counter, are written to disk.

In the event of a failure and subsequent database system recovery, the synopsis entry row counter notifies the database management unit 101 that data in the in-memory synopsis entry 106 must be regenerated. Since the normal transaction commit logic ensured that the base table data is recoverable from disk, the in-memory synopsis entry 106 can be regenerated by scanning the number of rows specified by the synopsis entry row counter, as the synopsis entry row counter value reflects the number of rows not covered by the on-disk synopsis entries. When the in-memory synopsis entries are persisted to disk fairly regularly per the criteria configurations, any lost in-memory synopsis entry can be regenerated by scanning a small number of rows from the base table 104. Preferably, the criteria are configured such that only the last page of records from the base table 104 need to be scanned to regenerate the lost in-memory synopsis entry, which promotes efficiency in database recovery time. To further help database recovery time, the in-memory synopsis entry does not need to be immediately regenerated, but instead can be regenerated in a "lazy" fashion, i.e., only when the associated base table is referenced by a query or a new insert transaction. For example, if 1000 base tables were updated prior to the database failure, resulting in 1000 lost in-memory synopsis entries, and 900 of those tables are never accessed again after the failure, then only those 100 tables that continue to be referenced need to have their in-memory synopsis entries regenerated.

Figure 4A:
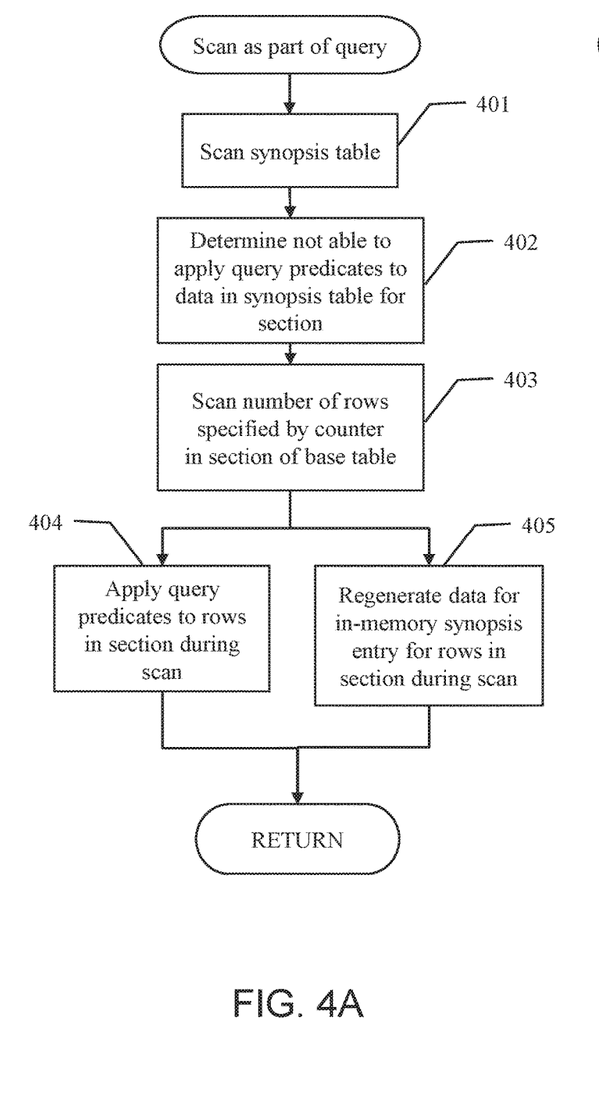
FIGS. 4A-4B are flowcharts illustrating methods for regeneration of a lost in-memory synopsis entry, according to embodiments of the present invention.
Figure 4B:
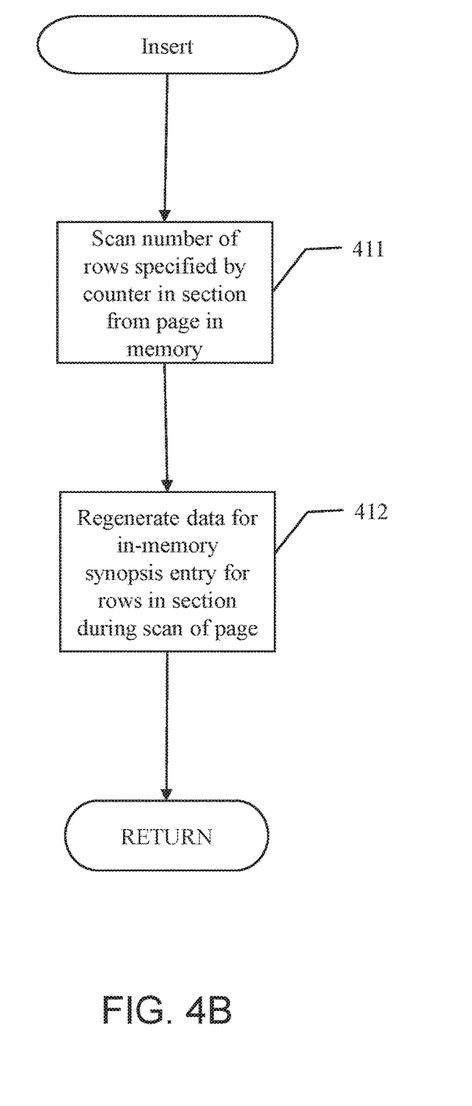

FIGS. 4A-4B are flowcharts illustrating methods for regeneration of a lost in-memory synopsis entry. How the lost in-memory synopsis entry 106 is regenerated depends on whether the first access to the base table 104 after the loss of the in-memory synopsis entry is a scan as part of a query or a new insert operation into the base table 104. Referring to FIG. 4A, when the first access to the base table 104 after the loss of the in-memory synopsis entry is a scan as part of a query, the synopsis table 105 will first be scanned (401). Since there is no on-disk synopsis entry for the rows covered only by the lost in-memory synopsis entry, the database management unit 101 determines from the synopsis table scan that it is not able to apply the query predicates against the minimum and maximum data values 110-111, and/or other metadata, for the section comprising these rows (402). In response, the database management unit 101 scans the number of rows specified by the synopsis entry row counter in this section of the base table 104 (403). The database management unit 101 applies the query predicate individually against those rows during the scan (404), and at the same time, regenerates the data for the in-memory synopsis entry 106 for all columns, or for a subset of columns, for the rows as if the scanned rows were being inserted (405). For databases that append new rows to the end of a base table, the scan typically requires only scanning the very last page from the base table, and no significant query performance impact should be observed.

Referring to FIG. 4B, when the first access to the base table 104 is a new insert transaction, such as the insert transaction illustrated in FIG. 3. The number of rows specified by the synopsis entry row count are scanned from a page in the memory (411). For databases that append new rows to the end of a base table, the new row(s) to be inserted are likely to be inserted into the same page as the rows that were covered by the lost in-memory synopsis entry. This page would have already been read into memory as part of the insert operation. The data for the in-memory synopsis entry 106 for rows in the section is regenerated during the scan of the page (412), with no significant impact to the performance of the insert operation.

In both FIGS. 4A and 4B, after the data for the in-memory synopsis entry 106 is regenerated, it can be used in future synopsis table scans and can be updated for future table insert operations.

Figure 5:
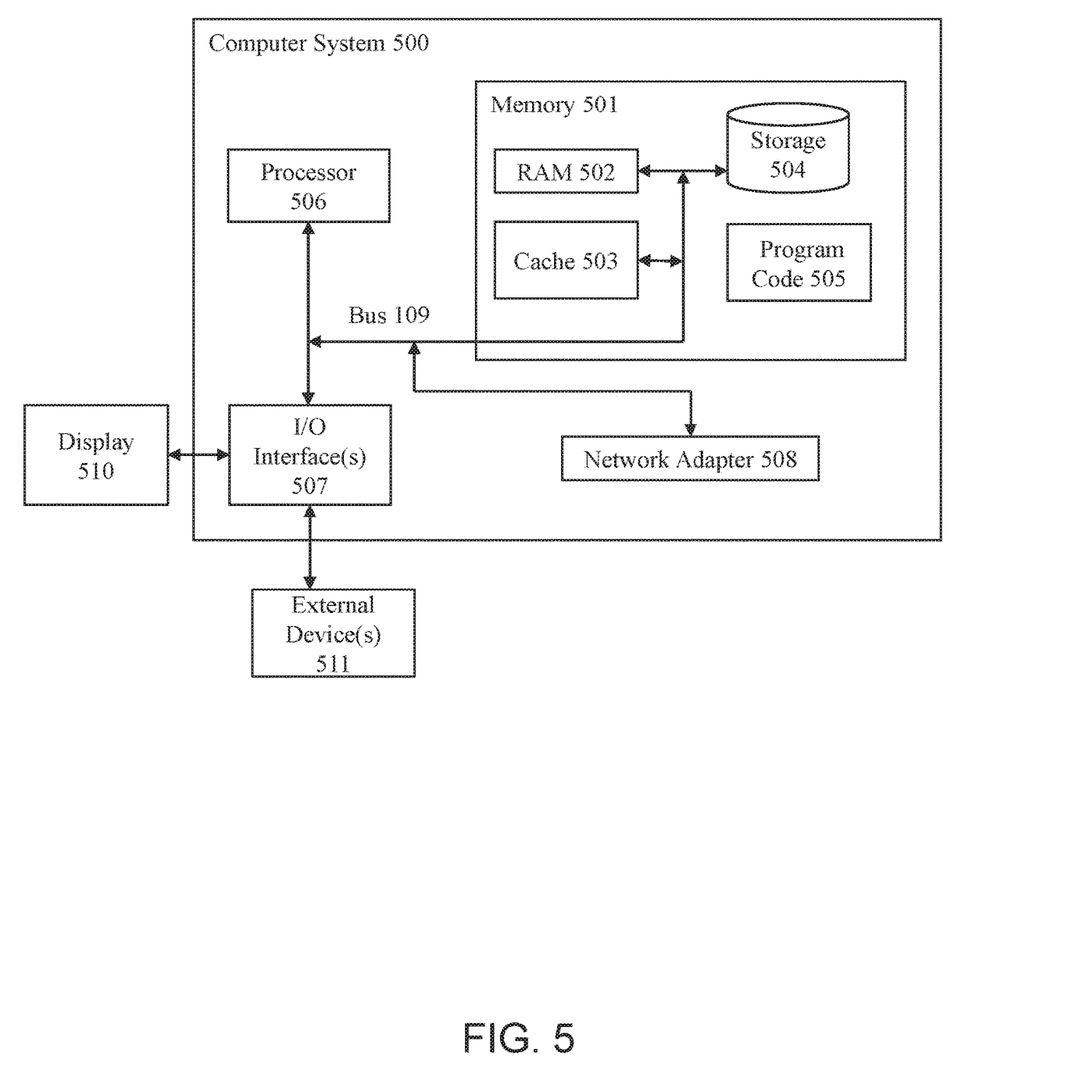
FIG. 5 is a block diagram of components of a computing system, in accordance with an embodiment of the present invention.

FIG. 5 is a block diagram of components of a computing system, in accordance with an illustrative embodiment of the present invention. In should be appreciated that FIG. 5 provides only an illustration of one implementation and does not imply any limitations with regard to the environments in that different embodiments may be implemented. Many modifications to the depicted environment may be made.

In the illustrative embodiment, database system 100 of FIG. 1 can be shown in the form of a computer system, such as computer system 500. The components of computer system 500 may include, but are not limited to, one or more processors or processing units 506, memory 501, and bus 509 that couples various system components, including the memory 501 to the processor 506. The bus 509 represents one or more of any of several types of bus structure, including a memory bus or memory controller, a peripheral bus, an accelerated graphics port, and a processor or local bus using any of a variety of bus architectures. The memory 501 may include computer readable media in the form of volatile memory, such as random access memory (RAM) 502 or cache memory 503, or non-volatile storage media 504. The memory 501 may include at least one program product having a set of at least one program code module 505 that are configured to carry out the functions of the illustrative embodiments of the present invention when executed by the processor 506. The computer system 500 may also communicate with one or more external devices 511, such as a display 510, via I/O interfaces 507. The computer system 500 may communicate with one or more networks via network adapter 508.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for regenerating a missing in-memory synopsis entry corresponding to a section of a base table stored in a storage medium comprised in a database system, the storage medium further storing a synopsis table, the database system further comprising a memory and a database management unit for implementing the method comprising:
when performing a scan of the base table as part of a query:
scanning the in-memory synopsis table stored in the storage medium;
determining inability to apply at least one query predicate of the query to data in the synopsis table for a given section of the base table due to the missing in-memory synopsis entry for the given section of the base table;
in response, reading a synopsis entry row count persistently stored in base table metadata of the base table, the persistently stored synopsis entry row count indicating the number of rows in the given section of the base table covered by the in-memory synopsis entry;
scanning the number of rows in the given section of the base table as specified by the synopsis entry row count;
during the scan, applying the query predicates to the rows in the given section of the base table; and
during the scan, regenerating the missing in-memory synopsis entry for at least one column for the rows in the given section of the base table; and
when performing an insert transaction to insert at least one row in the given section of the base table:
reading the synopsis entry row count persistently stored in the base table metadata of the base table, the synopsis entry row count indicating the number of rows in the given section of the base table covered by the in-memory synopsis entry;
determining, from the synopsis entry row count, that there is the missing in-memory synopsis table entry for the given section of the base table;
in response, scanning the number of rows in the given section of the base table as specified by the synopsis entry row count; and
regenerating the missing in-memory synopsis entry for at least one column for the rows in the given section of the base table.

2. The method of claim 1, further comprising:
performing a second insert transaction to insert at least a second row in the given section of the base table;
determining that the in-memory synopsis entry for the given section of the base table is stored in the memory;
retrieving the in-memory synopsis entry for the given section of the base table; and
updating metadata values in the in-memory synopsis entry for the given section of the base table with data from at least the second row being inserted into the base table.

3. The method of claim 2, further comprising:
determining that the in-memory synopsis entry for the given section of the base table is to be persisted to disk according to at least one predetermined criteria; and
in response, storing the in-memory synopsis entry in the synopsis table.

4. The method of claim 3, wherein the at least one predetermined criteria comprise one or more of the following: persisting the in-memory synopsis entry for the given section of the base table asynchronously to the insert transaction; a certain number of rows have been added to the base table; an entire page or section of the base table is full; and a certain amount of time has elapsed.

5. The method of claim 2, wherein the committing of the second insert transaction comprises:
writing to the storage medium at least the second row into the base table; and
writing to the storage medium updated base table metadata of the base table, the updated base table metadata comprising the synopsis entry row count indicating the number of rows in the given section of the base table covered by the in-memory synopsis entry.

6. A database system comprising:
at least one storage medium for storing a base table and a synopsis table;
a memory; and a database management unit for implementing a method for regenerating a missing in-memory synopsis entry corresponding to a section of the base table stored in the storage medium, comprising:
when performing a scan of the base table as part of a query:
scanning the in-memory synopsis table stored in the storage medium;
determining inability to apply at least one query predicate of the query to data in the synopsis table for a given section of the base table due to the missing in-memory synopsis entry for the given section of the base table;
in response, reading a synopsis entry row count persistently stored in base table metadata of the base table, the persistently stored synopsis entry row count indicating the number of rows in the given section of the base table covered by the in-memory synopsis entry;
scanning the number of rows in the given section of the base table as specified by the synopsis entry row count;
during the scan, applying the query predicates to the rows in the given section of the base table; and
during the scan, regenerating the missing in-memory synopsis entry for at least one column for the rows in the given section of the base table; and
when performing an insert transaction to insert at least one row in the given section of the base table:
reading the synopsis entry row count persistently stored in the base table metadata of the base table, the synopsis entry row count indicating the number of rows in the given section of the base table covered by the in-memory synopsis entry;
determining, from the synopsis entry row count, that there is the missing in-memory synopsis table entry for the given section of the base table;
in response, scanning the number of rows in the given section of the base table as specified by the synopsis entry row count; and
regenerating the missing in-memory synopsis entry for at least one column for the rows in the given section of the base table.

7. The database system of claim 6, further comprising:
performing a second insert transaction to insert at least a second row in the given section of the base table;
determining that the in-memory synopsis entry for the given section of the base table is stored in the memory;
retrieving the in-memory synopsis entry for the given section of the base table; and
updating metadata values in the in-memory synopsis entry for the given section of the base table with data from at least the second row being inserted into the base table.

8. The database system of claim 7, further comprising:
determining that the in-memory synopsis entry for the given section of the base table is to be persisted to disk according to at least one predetermined criteria; and
in response, storing the in-memory synopsis entry in the synopsis table.

9. The database system of claim 8, wherein the at least one predetermined criteria comprise one or more of the following: persisting the in-memory synopsis entry for the given section of the base table asynchronously to the insert transaction; a certain number of rows have been added to the base table; an entire page or section of the base table is full; and a certain amount of time has elapsed.

10. The database system of claim 7, wherein the committing of the second insert transaction comprises:
writing to the storage medium at least the second row into the base table; and
writing to the storage medium updated base table metadata of the base table, the updated base table metadata comprising the synopsis entry row count indicating the number of rows in the given section of the base table covered by the in-memory synopsis entry.

11. A computer program product for regenerating a missing in-memory synopsis entry corresponding to a section of a base table stored in a non-transitory storage medium comprised in a database system, the non-transitory storage medium further storing a synopsis table, the computer program product comprising a computer readable storage medium having program instructions embodied therewith, the program instructions executable by a processor to cause the database system to perform a method comprising:
when performing a scan of the base table as part of a query:
scanning the in-memory synopsis table stored in the storage medium;
determining inability to apply at least one query predicate of the query to data in the synopsis table for a given section of the base table due to the missing in-memory synopsis entry for the given section of the base table;
in response, reading a synopsis entry row count persistently stored in base table metadata of the base table, the persistently stored synopsis entry row count indicating the number of rows in the given section of the base table covered by the in-memory synopsis entry;
scanning the number of rows in the given section of the base table as specified by the synopsis entry row count;
during the scan, applying the query predicates to the rows in the given section of the base table; and
during the scan, regenerating the missing in-memory synopsis entry for at least one column for the rows in the given section of the base table; and
when performing an insert transaction to insert at least one row in the given section of the base table:
reading the synopsis entry row count persistently stored in the base table metadata of the base table, the synopsis entry row count indicating the number of rows in the given section of the base table covered by the in-memory synopsis entry;
determining, from the synopsis entry row count, that there is the missing in-memory synopsis table entry for the given section of the base table;
in response, scanning the number of rows in the given section of the base table as specified by the synopsis entry row count; and
regenerating the missing in-memory synopsis entry for at least one column for the rows in the given section of the base table.

12. The computer program product of claim 11, further comprising:
performing a second insert transaction to insert at least a second row in the given section of the base table;
determining that the in-memory synopsis entry for the given section of the base table is stored in the memory;
retrieving the in-memory synopsis entry for the given section of the base table; and updating metadata values in the in-memory synopsis entry for the given section of the base table with data from at least the second row being inserted into the base table.

13. The computer program product of claim 12, further comprising:
  determining that the in-memory synopsis entry for the given section of the base table is to be persisted to disk according to at least one predetermined criteria; and
  in response, storing the in-memory synopsis entry in the synopsis table.

14. The computer program product of claim 13, wherein the at least one predetermined criteria comprise one or more of the following: persisting the in-memory synopsis entry for the given section of the base table asynchronously to the insert transaction; a certain number of rows have been added to the base table; an entire page or section of the base table is full; and a certain amount of time has elapsed.

15. The computer program product of claim 12, wherein the committing of the second insert transaction comprises:
  writing to the storage medium at least the second row into the base table; and
  writing to the storage medium updated base table metadata of the base table, the updated base table metadata comprising the synopsis entry row count indicating the number of rows in the given section of the base table covered by the in-memory synopsis entry.

* * * * *